Patented Mar. 29, 1932

1,851,085

UNITED STATES PATENT OFFICE

WALTER BRUCK, OF MANNHEIM, GERMANY, ASSIGNOR TO GENERAL ANILINE WORKS, INC., OF NEW YORK, N. Y., A CORPORATION OF DELAWARE

HALOGEN ANTHRAQUINONE ACRIDONES

No Drawing. Application filed June 5, 1930, Serial No. 459,426, and in Germany June 10, 1929.

The present invention relates to the production of halogen derivatives of anthraquinone-2.1(N)-benzacridone.

I have found that halogen derivatives of anthraquinone-2.1(N)-benzacridone corresponding to the formula:

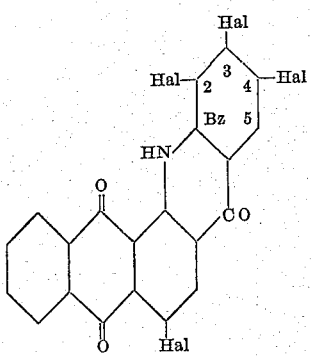

are valuable vat dyestuffs in view of the brilliant dyeings they produce on cotton. While the tetra-chloroanthraquinone-2.1(N)-benzacridone containing the four halogen atoms in the benzene nucleus dyes cotton orange shades, the 4-Bz2.3.4-tetrachloroanthraquinone-2.1(N)-benzacridone dyes cotton brilliant red shades with a bluish tinge. Apparently it is not the number of halogen atoms present in the molecule but their position in the molecule which is determinative of the shade of dyeing of tetrahalogenanthraquinone-2.1(N)-benzacridones.

The 4-Bz2.3.4-tetrahalogenanthraquinone-2.1(N)-benzacridones may be produced by treating with halogenating agents those anthraquinone-2.1(N)-benzacridones the benzene nucleus of which is substituted by halogen at least in the Bz3-position and has a Bz5-position free from halogen or by condensing 1.4-dihalogenanthraquinone-2-carboxylic acids or acid esters with 2.3.4-trihalogen anilines with subsequent ring closure to form acridones.

The following examples will further illustrate how the said invention may be carried out in practice, but the invention is not restricted to these examples. The parts are by weight.

Example 1

22 parts of 1.4-dichloroanthraquinone-2-carboxylic acid benzyl ester are heated for 4 hours at from 180° to 190° centigrade with 10 parts of 2.3.4-trichloroaniline, 6 parts of anhydrous sodium acetate, 0.3 part of copper oxide and 30 parts of nitrobenzene. After cooling the melt is introduced into 200 parts of concentrated sulphuric acid and is stirred for an hour at about 30° centigrade. The solution is then poured into water and the nitrobenzene is expelled with steam. The remaining 1-trichloroanilido-4-chloroanthraquinone-2-carboxylic acid is filtered by suction and dried.

24 parts of the acid are stirred for 2 hours at from 150° to 155° centigrade with 80 parts of dry nitrobenzene and 10 parts of acetic acid anhydride. The reaction mass is then diluted with 80 parts of dry nitrobenzene and 3 parts of concentrated sulphuric acid are added at 90° centigrade. The whole is then kept at the same temperature while stirring for about 3 hours and the reaction product is filtered off by suction after cooling. It is washed with nitrobenzene, freed from solvent by steam distillation and from alkali-soluble impurities by boiling up with dilute sodium carbonate solution. The dyestuff may be crystallized from trichlorbenzene. According to analysis it contains 4 atoms of chlorine. The color of the solution in concentrated sulphuric acid is orange red and the vat is violet. The product gives brilliant bluish red dyeings of very good fastness on cotton.

Example 2

5 parts of Bz2.3.4-trichloroanthraquinone-2.1(N)-benzacridone (prepared by condensation of 1-chloroanthraquinone-2-carboxylic acid benzyl ester with 2.3.4-trichloroaniline, saponification into the free acid and condensation of this free acid into acridone) are suspended in 120 parts of dry nitrobenzene and after the addition of 0.4 part of iodine, 15 parts of sulphuryl chloride are gradually introduced while stirring at from 90° to 100° centigrade. The whole is then stirred for about 5 hours at the same temperature, the excess of sulphuryl chloride is expelled by means of a stream of dry air and after cooling the reaction product is filtered off by suction. It is washed with nitrobenzene and after the addition of sodium carbonate is subjected to steam distillation. The dyestuff which remains behind is filtered off by suction and dried. It may be crystallized from trichlorbenzene. According to analysis the product is a tetrachloroanthraquinone-2.1-(N)-benzacridone and corresponds in its properties with the dyestuff obtained in Example 1.

Example 3

After the addition of 0.7 part of iodine, 30 parts of sulphuryl chloride are gradually introduced at from 90° to 100° centigrade into a suspension of 9 parts of Bz3-chloroanthraquinone-2.1(N)-benzacridone obtainable by condensation of 1-chloroanthraquinone with 1-amino-3-chloro-6-benzene-carboxylic acid, ring closure then being effected, in 180 parts of nitrobenzene. Stirring is carried on for about 3 hours at the same temperature and the cooled reaction mass is then filtered off by suction. This is then worked up in the manner described in the foregoing examples.

According to analysis the product is a tetrachloroanthraquinone-2.1(N)-benzacridone and practically corresponds in its properties with the products obtained in the foregoing examples. The dyestuff when heated with diethylaniline in the presence of copper is converted into a dyestuff containing less chlorine, dissolving in concentrated sulphuric acid giving an orange yellow solution and dyeing cotton from a violet vat orange red shades.

What I claim is:—

1. As new articles of manufacture 4-Bz2.-3.4-tetrahalogenanthraquinone-2.1(N)-benzacridones dissolving in concentrated sulphuric acid to give orange red solutions and dyeing cotton from violet vats brilliant red shades with a bluish tinge.

2. As a new article of manufacture 4-Bz2.-3.4-tetrachloroanthraquinone-2.1(N)-benzacridone dissolving in cencentrated sulphuric acid to give an orange red solution and dyeing cotton from a violet vat brilliant red shades with a bluish tinge, the said dyestuff when heated with diethylaniline in the presence of copper being converted into a dyestuff containing less chlorine, dissolving in concentrated sulphuric acid giving an orange yellow solution and dyeing cotton from a violet vat orange red shades.

In testimony whereof I have hereunto set my hand.

WALTER BRUCK.